United States Patent
Restrepo

(10) Patent No.: US 10,476,271 B2
(45) Date of Patent: Nov. 12, 2019

(54) ENERGY SUPPLY SYSTEM AND ELECTRICAL OUTLET

(71) Applicant: Sonnen GmbH, Wildpoldsried (DE)

(72) Inventor: Carlos Restrepo, Atlanta, GA (US)

(73) Assignee: Sonnen GmbH, Wildpoldsried (DE)

( * ) Notice: Subject to any disclaimer, the term of this patent is extended or adjusted under 35 U.S.C. 154(b) by 132 days.

(21) Appl. No.: 15/856,784

(22) Filed: Dec. 28, 2017

(65) Prior Publication Data

US 2019/0207390 A1    Jul. 4, 2019

(51) Int. Cl.
*H02J 3/28* (2006.01)
*H02J 3/06* (2006.01)
*H02J 3/46* (2006.01)

(52) U.S. Cl.
CPC ...... *H02J 3/28* (2013.01); *H02J 3/06* (2013.01); *H02J 3/46* (2013.01)

(58) Field of Classification Search
CPC .............. H02J 3/28; H02J 3/06; H02J 3/46
See application file for complete search history.

(56) References Cited

U.S. PATENT DOCUMENTS

2013/0264874 A1* 10/2013 Ropp ............... H02J 4/00
307/51

* cited by examiner

*Primary Examiner* — Robert L Deberadinis
(74) *Attorney, Agent, or Firm* — Sughrue Mion, PLLC

(57) ABSTRACT

An energy supply system and electrical outlet are provided. An energy supply system includes an electrical power source connected to an inverter device for forming a local power grid. The electrical outlet includes frequency measuring means for measuring the frequency of the electrical power feed into said local power grid by said inverter device and power control means for controlling said electrical power provided to a load by said electrical outlet dependent on the measured frequency.

17 Claims, 2 Drawing Sheets

ENERGY SUPPLY SYSTEM AND ELECTRICAL OUTLET

FIELD OF THE INVENTION

The invention relates to energy supply systems and electrical outlets. In particular, the invention relates to energy supply systems comprising an electrical power source connected to an inverter device for forming a local power grid.

BACKGROUND OF THE INVENTION

Sustainable local energy sources call for energy supply systems having their local power grids supplied by electrical power sources, which are independent of the main grid provided by the local or regional electricity supplier. The electrical power source may be a renewable energy device, such as a solar cell module or a wind turbine. Or it may be an electrical storage device, such as a battery, in which case the energy supply systems can be run with backup when the main grid is experiencing a power outage.

In either case, the local power grid or microgrid is supposed to function as a self-sufficient and reliable electricity provider for one or multiple loads connected to it. The electrical power source is usually connected to an inverter device, which transforms the usually DC power of the electrical power source to an AC power to feed into the local power grid. In such a microgrid environment, controlling one or multiple of the loads may be desirable in order to guarantee reliable operation of the system even when the electrical power source is experiencing fluctuations or is running low. As part of a load management process, certain non-essential loads may be disconnected or run at a lower power level in order to ensure power delivery to indispensable or essential loads. Furthermore, such control capabilities may be exploited for implementing remote control for home automation.

Systems for controlling power to a load can be implemented with an intelligent or controllable power outlet or power receptacle, which the load is plugged into. Such solutions usually require one operator or source of a control signal for controlling the load and a medium or channel to carry the control signal. The command is typically sent in the form of radio signals, such as wifi, zigbee, z-wave, or logic signals in a separate communications bus, such as Modbus, canbus, etc. There are other approaches that use embedded communication protocols in the power lines, such as Broadband over the Power-line or BPL. All of these implementations allow the transmission of complex signals that need to be decoded and acted upon by the recipient.

These solutions can be extremely complex and therefor result in very expensive propositions, leading to costs per receptacle, which are multiple times that of a normal "dumb" receptacle. Furthermore, the use of such systems is not always reliable, as they are extremely susceptible to the environment they are exposed to. In the case of BPL, circuit connections and distances can significantly attenuate the transmission line, making it very difficult to maintain constant communication. Wi-Fi and other means can have difficulty achieving proper range if there are walls and objects in direct line of sight between two of the nodes.

Therefore, there is a need for a more simple approach for controlling power to a load that can render a more reliable response for certain applications. It is therefore an object of this invention to provide an energy supply system and an electrical outlet for controlling the power supplied to one or multiple loads in a reliable and economical fashion.

SUMMARY OF THE INVENTION

In order to achieve the above-mentioned objective, according to one aspect of the invention, an energy supply system is provided. According to another aspect of the invention, an electrical outlet is provided.

The solution provided by the invention relies on utilizing grid frequency as a control signal. This control signal is detected by the electrical outlet and used for controlling the power supplied to the load that is connected to the outlet.

To this end, the energy supply system according to the invention comprises an electrical power source, an inverter device connected to said electrical power source, and an electrical outlet connected to said inverter device through a local power grid. The inverter device is adapted to convert electrical power provided by said electrical power source for feeding into said local power grid. In particular, the inverter is adapted to convert a DC power to an AC power.

Said electrical outlet is adapted for providing electrical power from said inverter device to a load when said load is connected to said electrical outlet. The electrical outlet according to the invention comprises frequency measuring means for measuring the frequency of the electrical power fed into said local power grid by said inverter device and power control means for controlling said electrical power provided to said load by said electrical outlet dependent on the measured frequency. The frequency may be measured repeatedly in short time intervals of seconds or less. Advantageously, the frequency measuring means is adapted to monitor the frequency in real-time and/or continuously. The measured frequency may in fact be a frequency averaged over multiple measurements and/or over a specific amount of time.

According to an advantageous embodiment, said power control means are adapted to supply electrical power from said local power grid to said load substantially unattenuated, if the measured frequency lies within a nominal frequency range. The nominal frequency range may in particular be a frequency range centered on or encompassing an average frequency of a main power on a main grid supplied by a regional or national electricity distributor or power company, supplying the region where the energy supply system is implemented or where the components of the energy supply system, in particular the electrical outlet, is sold. In particular, the nominal frequency range may be a range centered on or encompassing 50 Hz, e.g. in Europe, or centered on or encompassing 60 Hz, e.g. in the USA.

Supplying electrical power from said local power grid to said load substantially unattenuated means that said power control means may substantially act as if the load was directly connected to said local power grid, aside from possible attenuations due to unavoidable power losses in the power outlet. In other words, in this case, the power from the inverter device is directly supplied to the load. In particular, the full voltage at the local power grid is also applied to the load.

According to an advantageous embodiment, said power control means are adapted to electrically disconnect said load from said local power grid. For this purpose, said power control means may comprise a switch or disconnector, in particular for achieving a galvanic disconnection. Instead of a galvanic disconnection, the power supplied to the load may be drastically attenuated such that only a small percentage of the nominal power will reach the load, e.g. less than 1% or 2%.

Alternatively, said power control means may be adapted to supply electrical power from said local power grid to said load in attenuated fashion, if the measured frequency lies within a predetermined frequency range. Such attenuation may be a function of the measured frequency. In particular, the attenuation may be a linear or inverse linear function of the frequency within a certain frequency range, for example within said predetermined frequency range or across a limit of the predetermined frequency range. If the load is a light source, such an implementation may be used to realize a dimmer function.

The predetermined frequency range may be open-ended on one side, in which case one may speak of a predetermined frequency threshold, the overshooting or undershooting of which may lead to said attenuation or switching-off of the power supplied to the load.

Advantageously, the energy supply system comprises a further electrical outlet connected to said inverter device through said local power grid. The further electrical outlet is for providing electrical power from said inverter device to a further load. The further electrical outlet comprises further power control means and further power control means. The further power control means are adapted to electrically disconnect said further load from said local power grid or to supply electrical power from said local power grid to said further load in attenuated fashion, if the measured frequency lies within a further predetermined frequency range. Generally speaking, the system may comprise multiple loads, each of which is connected to and its power supply controlled by its own electrical outlet. Two or more loads may also be connected to a single electrical outlet and their power supply thus be controlled together.

Said further predetermined frequency range differs from said predetermined frequency range. Furthermore, said further predetermined frequency range may overlap with said predetermined frequency range. Alternatively, the two frequency ranges may be not-overlapping and in fact may be separated by a small buffer range. If there are multiple electrical outlets with multiple predetermined frequency ranges, the above said may apply pairwise to any two of the frequency ranges. In particular, the frequency ranges may be places non-overlapping or overlapping successively along the frequency axis. It is also possible that one or more of the frequency ranges is completely within another one of the frequency ranges.

Having more than one predetermined frequency ranges, has the advantage that loads may be sorted into priority groups, depending on the importance or relevance of the loads. For example, essential loads, such as refrigerators, servers, etc., may be grouped into a first priority group, corresponding to a first frequency range. Non-essential, but still-important loads may be in a second priority group, and the rest of the loads may be put into a third priority group. The third frequency range may encompass the second and first frequency ranges, while the second frequency range encompasses the first frequency range. Once it is decided that all loads only in the third priority group should be disconnected or their power reduced, the inverter device may produce and supply power to the local grid with frequency that lies within the third frequency range, but not within the first and second frequency ranges. The power outlet or outlets for these loads in the third priority group will then attenuate or disconnect the power to them, while the power outlets of the loads in the first and second priority groups will keep the respective loads supplied with unattenuated power. Likewise, if it is decided that only the essential loads (first priority group) should be kept supplied through the local power grid, the inverter device can set the frequency of the power on the local power grid within the second and third frequency ranges, but outside the first frequency range.

According to an advantageous embodiment, the energy supply system comprises a main grid connection and a transfer switch adapted to switch the feed into said local power grid between said inverter device and said main grid connection. The main grid connection is connected to the main grid available at the site of the energy supply system. This can in particular be a regional or national power grid supplied by a power supplier with mains electricity. Depending on the position or switch state of the transfer switch, the local power grid receives its power either from the main grid coming through the main grid connection, or from the electrical power source. The latter situation is an off-grid mode of operation, in which the local power grid is independent of the main power grid. The transfer switch may be more complex and allow choosing between different electrical power sources, such as a power generator and a battery.

As mentioned before, the electrical power source may be an electrical power storage device, such as a battery, or an electrical power generator, such as a wind turbine, a solar cell module, a fuel-run emergency backup generator or the like. The electrical power source may also be a system comprising multiple such individual electrical power sources, which are controlled by a management system, possibly together with the transfer switch, in order to assure a continuous power supply to the local power grid in conjunction with the inverter device. Furthermore, the electrical power source and the inverter device may be adapted to provide excess power to the external main grid.

Advantageously, the predetermined frequency range lies outside of a frequency fluctuation range of a frequency of a main grid. National grids operate on a nominal power frequency. In the USA, the frequency of the mains electricity is 60 Hz, while in Europe it is generally 50 Hz. However, due to a number of issues, in particular due to fluctuation in demand and supply of electrical power, the frequency usually fluctuates around this nominal value. In western Europe, these fluctuations are typically within a 0.2 Hz frequency range. In extreme circumstances they might be within a 1 Hz frequency range in a specific geographical region. In such a case, if in the USA, the frequency fluctuation range might start at 59.5 Hz and end at 60.5 Hz. Ensuring that the predetermined frequency range lies outside of this frequency fluctuation range has the advantage of being able to avoid accidentally triggering a reaction from the power control means, and thus inadvertently switching the load off, every time the frequency at the local power grid wanders away from the nominal frequency.

According to a preferred embodiment, said power control means are adapted for controlling said electrical power provided to said load by said electrical outlet dependent on the measured frequency after a predetermined time delay. In other words, there is a delayed response to a change in frequency. Such feature can e.g. give the load time to initiate a shutdown sequence before its power is suddenly cut off. The amount of time delay may be encoded in the frequency such that it depends on the measured frequency.

The frequency of the local power grid is set by the inverter device. It is thus the inverter device that through the selection of the frequency is signaling the electrical outlet the amount of power to supply to the load or whether to turn the load on or off. By allowing a building management system, such as a home automation system, to program the inverter device and thus select the frequency of the local power grid, the building management system may control the electrical outlets and thus the loads in a building. The frequency may also be controlled by a human user, for example by allowing him to vary the frequency within a specific frequency range or allowing him to switch between individual frequency values.

Alternatively, the system may be utilized to implement a load prioritization in case of a power failure or a looming power failure at the local power grid. For this, said inverter device is adapted to adjust the frequency of the electrical power fed into said local power grid dependent on a power level, such as an output voltage or output current, of said electrical power source. For example, if the power level of the electrical power source, such as a battery, goes down, the inverter device may change the frequency of the local power grid from a nominal frequency range to the predetermined frequency range. The electrical outlet may then be adapted to switch the load off and thus save power in order to no longer burden the electrical power source. The reduction of the power level of the electrical power source is in this case treated to indicate a possible future power failure or to indicate that the supply is not enough to cover the demand on the local power grid. The load that is connected to this intelligent electrical outlet can thus be regarded as having a lower priority or as being non-essential compared to other loads, which might be connected to the local power grid through other, non-intelligent outlets.

A more complex building management system and/or load prioritization system may be implemented by utilizing two or more electrical outlets, having differing predetermined frequency ranges. When the local grid frequency is set to a value within a first predetermined frequency range, a first load might be switched off by its corresponding outlet, while a second load might be switched off, when the local grid frequency is set to a value within a second predetermined frequency range. If the two predetermined frequency ranges overlap, then both loads may be switched off by placing the local grid frequency in the overlapping region of the two ranges. By placing the local grid frequency only within one of the two predetermined frequency ranges, only one or the other load is switched off.

In other embodiments, said power control means may be adapted to initiate a periodic switching or modulation based on a momentary frequency of power on the local power grid set by the inverter device. In other words, the power control means can cause the power to the load to be turned on for an amount of time and turned off by the same or a different amount of time, creating a continuing ON/OFF pattern.

In even more complex implementations, multiple states of operation can be encoded at different frequencies. For example, if the load is a complex machine having different states depending on the power input, instead of just the states ON and OFF, setting specific local power grid frequencies may be used to change the machine from one state to the next. Thus, the states of the machine may be encoded in the frequencies of the power supplied to the local power grid by the inverter device.

Advantageously, said electrical outlet comprises a clock and said power control means are adapted to reduce or cut electrical power provided to said load by said electrical outlet, if the measured frequency lies within a predetermined frequency range for a duration measured by said clock, which lies within a predetermined duration range. In particular, the power from the local power grid may be provided to the load unattenuated even if the frequency of the local power grid lies within a predetermined frequency range, which would otherwise trigger a disconnection of the load from power, provided that this change in frequency takes place only for a short duration, as long as this duration is lower than said predetermined duration range. It should be stressed that in an advantageous embodiment, the power reduction or disconnection takes place only when the measured duration lies within said predetermined duration range and not when it lies outside that predetermined duration range. Alternatively, there might be a further predetermined duration range, where the load may or may not be disconnected, depending on other factors, such as a user's response to an inquiry, an electric parameter of the load or the like. The scheme, where the power to a load is not cut or reduced immediately upon a change in frequency may be called frequency ride-through.

Advantageously, a frequency-duration-diagram may be provided, either explicitly or implicitly, wherein certain areas are defined that belong to specific reactions by the power control means. A first area may correspond to the power from the local grid being transferred to the load without unattenuated. This first area preferably covers a region along a parallel to the duration-axis at the nominal frequency value or the nominal frequency range. One or more second areas in the frequency-duration-diagram may correspond to power from the local grid reaching the load being unattenuated or disconnected. In practice, this may mean that the frequency of the local grid is monitored continuously, and when the frequency changes from the nominal value or the nominal range, a duration will be recorded from the time that change has occurred. When the frequency/duration pair falls inside the second area, the power to the load is attenuated or disconnected.

One or more third areas may also be defined in the frequency-duration-diagram, where as long as the frequency/duration pair is within that area or those areas, the decision whether to disconnect the load or leave it connected may be based on further parameters. If there are two or more third areas, they might be separated by a first area and/or a second area. In turn, a third area may separate a first from a third area.

Said predetermined duration range may be open ended towards longer durations. Similarly, in case of the frequency-duration-diagrams, each of the first, second or third areas may advantageously be open towards longer durations. In other words, if a duration falls within the predetermined duration range or if a frequency/duration pair falls within a certain area, then a longer duration will also fall within the same predetermined duration range or the frequency/duration pair with a larger duration also falls within that certain area.

According to a preferred embodiment, said electrical outlet comprises a clock and a power measuring means adapted to measure a power level on said local power grid, wherein said power control means are adapted to reduce or cut electrical power provided to said load by said electrical outlet, if the measured power level lies within a predetermined power range for a duration measured by said clock, which lies within a predetermined duration range. Also here, it should be stressed that in an advantageous embodiment, the power reduction or disconnection takes place only when the measured duration lies within said predetermined duration range and not when it lies outside that predetermined duration range.

There may be defined a different predetermined duration range for each predetermined power range. For example, the power control means may be adapted to provide power from the local grid to the load as long as the power level is within 90% to 100% of the nominal power level independent of duration, within 30% to 90% of the nominal power level for a duration of less than 0.6 s, and within 0% to 30% of the nominal power level for a duration of less than 0.15 s. In this case, three different predetermined duration ranges (0 to infinity, 0.6 s to infinity, and 0.15 s to infinity) are defined, corresponding to the three predetermined power ranges (90% to 100%, 30% to 90%, and 0% to 30% of the nominal power level of the local grid).

This behavior may be called voltage ride-through or power ride-through, because while a power level drop may be indicating a problem with the local grid that should be addressed by disconnecting certain loads from it, the system allows riding through the power drop as long as it lasts only a certain amount of time. It should be noted that in the present application, the expressions voltage and power may be used interchangeably, because e.g. attenuating the power provided to a load usually encompasses lowering the voltage at the input of that load.

Said predetermined duration range may be open ended towards longer durations. In other words, if a duration falls within the predetermined duration range, then a longer duration will also fall within the same predetermined duration range.

Preferably, the electrical outlet is an electrical receptacle or an electrical socket. Such a socket or receptacle may in particular be wall-mounted.

Preferably, the electrical outlet comprises a housing, which also houses said frequency measuring means and/or said power control means. Alternatively, said frequency measuring means and/or said power control means may be placed outside of the housing of the outlet and can be designed to communicate with each other via a wire or wireless connection. Multiple electrical outlets may be realized inside a single housing.

It should be noted that the power control means can control the power to the load by either controlling the electrical voltage or the electrical current or both from the local power grid to the load.

BRIEF DESCRIPTION OF THE DRAWINGS

The present invention will be explained in more detail in the following text with reference to a preferred embodiment of an energy supply system illustrated in FIG. 1, a preferred embodiment of an electrical outlet illustrated in FIG. 2, and possible output functions of several preferred embodiments of the electrical outlet illustrated in FIG. 3, all of which are not intended to be restrictive.

DETAILED DESCRIPTION

Figure 1:
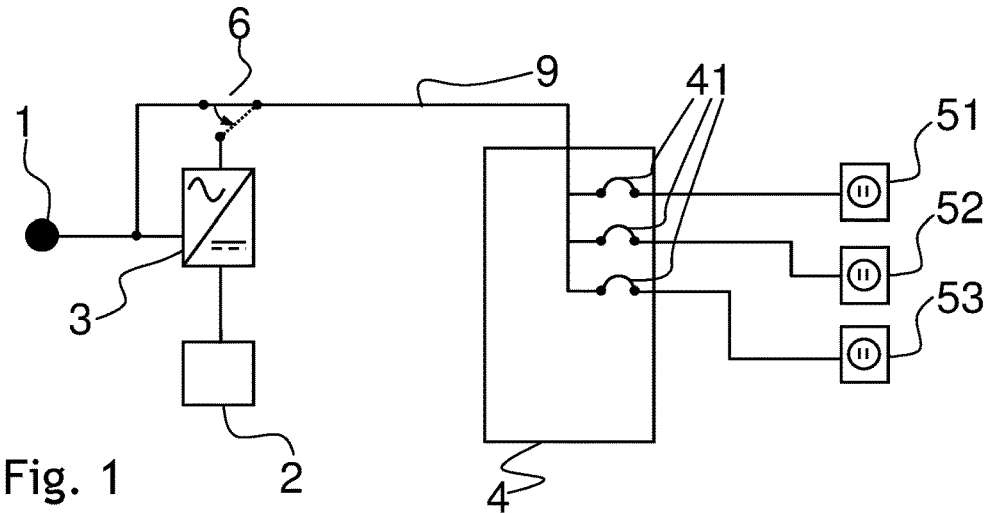
FIG. 1 is a schematic diagram of an energy supply system according to one advantageous embodiment.

FIG. 1 shows a schematic diagram of an energy supply system comprising an electrical power source 2 and multiple electrical outlets 51, 52, 53, which are located in a local site such as inside or around one or more buildings. It can be a residential or a commercial building. While the electrical power source 2 can be any device or groups of devices that can supply power for feeding to any or all the loads connected to the electrical outlets 51, 52, 53, such as renewable energy producing devices, in the following, it will be referred to as a battery 2.

The electrical outlets 51, 52, 53 are connected to a network of electrical leads that is referred to as a local power grid. In order to convert the DC power supplied by the battery 2 to an appropriate AC power for the loads connected to the electrical outlets 51, 52, 53, an inverter device 3 is connected to the battery 2 as input and to the local power grid 9 on its output side. A transfer switch 6 is set between the local power grid 9 and the inverter device 3 and also connected to a grid connection 1, which is connected or connectable to an external power grid, such as a national or regional power grid supplied by an electrical power company. Depending on the position or state of the transfer switch 6, either the power from the external power grid is fed into the local power grid 9, or the inverter is responsible for the power level and the frequency of the electrical power in the local power grid 9.

When the transfer switch 6 is switched to the inverter device 3, the local power grid 9 is independent of the external power grid and works in a self-reliant modus. The inverter device 3 has a further connection to the grid connector 1 in order to be able to feed electrical power from the battery 2 to the external power grid or to charge the battery 9 from the external power grid through the grid connection 1, even when the local power grid 9 is disconnected from the external power grid by the transfer switch 6.

To complete the picture, the local power grid 9 comprises an electrical distribution panel 4 with circuit breakers 41. Each of the electrical outlets 51, 52, 53, is fed electrical power through a corresponding of the circuit breakers 41. Usually, the building has many more than three electrical outlets and thus the electrical distribution panel 4 can have many more than three circuit breakers 41. However, in FIG. 1 only the three electrical outlets 51, 52, 53 are shown, which will be discussed in the following. While the first electrical outlet 51 is an electrical outlet according to the invention, being able to switch the load connected to it depending on the frequency of the power on the local power grid 9, the second electrical outlet 52 and third electrical outlet 53 can also be such "intelligent" electrical outlets, or one or both of them might be a "dumb" or passive electrical outlet without such capabilities.

Figure 2:
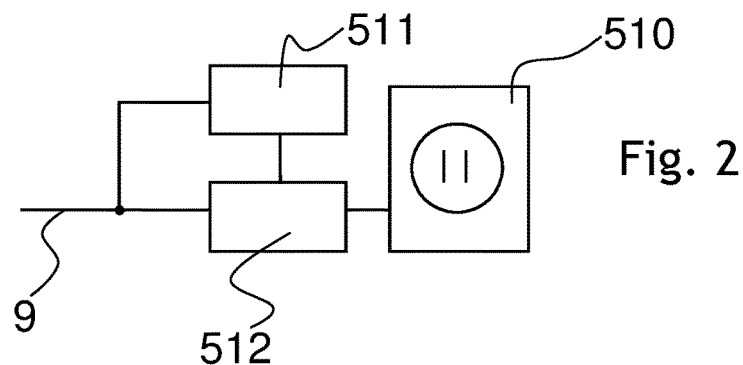
FIG. 2 is a schematic diagram of an electrical outlet according to one advantageous embodiment.

FIG. 2 shows a schematic diagram of an electrical outlet having an outlet housing 510, frequency measuring means 511 and power control means 512. The outlet housing 510 is in the form of a socket and designed for accepting and supporting an electrical plug of a load. The housing may be designed to accept multiple plugs of different loads as well. The frequency measuring means 511 measure the frequency of the power provided to the electrical outlet by the local power grid 9 and relay to the power control means 512 either this information or instructions on what power level to supply to the load as a response to the measurement. Depending on the measured frequency, the power control means 512 can either let the power from the local power grid 9 through to the socket and ultimately to the load plugged into it, or attenuate the power down to a complete disconnection of the load from the local power grid 9. Other, more complex responses to the measured frequency are possible as well.

Figure 3:
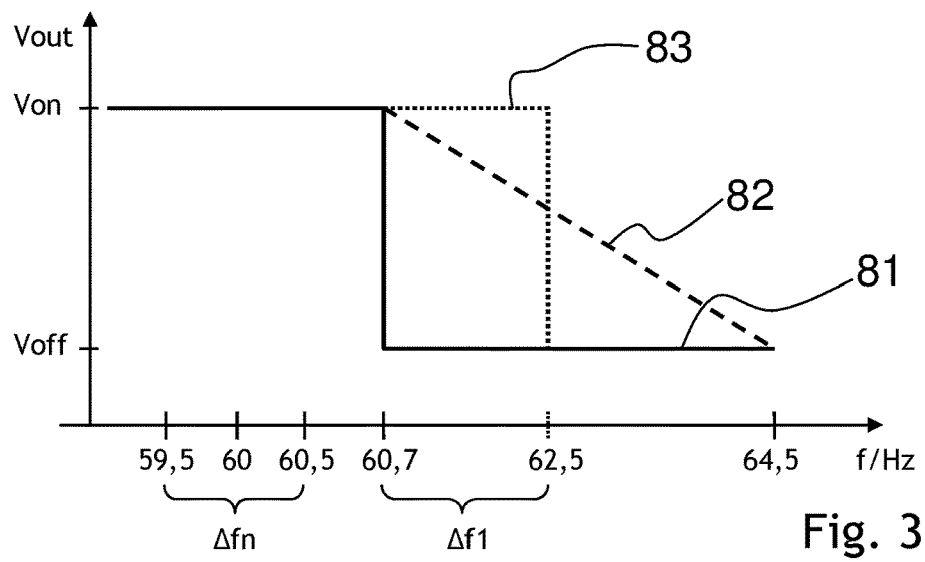
FIG. 3 is a diagram showing possible output functions of an electrical outlet as a function of frequency according to different advantageous embodiments.

FIG. 3 shows a frequency-voltage diagram with different functions 81, 82, 83 of possible voltages provided to the loads dependent on the frequency at the local power grid 9. The x-axis shows the frequency measured by frequency measuring means 511 of any of the electrical outlets 51, 52, 53. Assuming that the nominal frequency of the external power grid is 60 Hz, a nominal frequency range Δfn is shown to reach from 59.5 Hz to 60.5 Hz. This nominal frequency range Δfn is supposed to be the frequency range the power on the external power grid is expected to stay within, even if fluctuating considerably away from the nominal value of 60 Hz.

In order to avoid any unintended triggering of the power control means 512 due to "normal" frequency variations, in particular when the local power grid 9 is disconnected from the inverter device 3 and connected to the grid connector 1 by the transfer switch 6, the frequency measuring means 511 and/or the power control means 512 are adapted such that the actual adjustment of the power to the loads happens above a threshold of 60.7 Hz. Until that threshold is reached, the output voltage Vout of all electrical outlets, the output functions of which are shown in FIG. 3, is at a maximum voltage Von corresponding to the loads being supplied the full power from the local power grid 9.

A first output function 81 shown in FIG. 3 depicts the behavior of an electrical outlet according to a preferred embodiment, where the output voltage Vout is switched off for the corresponding load when the measured frequency surpasses this threshold. This is indicated by the off-voltage Voff, which can in particular be zero volts, although it is of course possible that the load is placed into an off-modus at an off-voltage Voff other than zero. As an alternative to a threshold-triggering operation, the first output function 81 may describe an electrical outlet, the power control means 512 of which switch the power to the load off, if the frequency measured by the frequency measuring means 511 is within a predetermined frequency range from 60.7 Hz to 64.5 Hz.

A second output function 82 describes a different behavior of the electrical outlet in the face of the local power grid frequency being in the predetermined frequency range than the first output function 81. According to the second output function 82, when the frequency measured by the frequency measuring means 511 is within a predetermined frequency range from 60.7 Hz to 64.5 Hz, the power control means 512 reduce the power supplied to the load by the electrical outlet. Here, the voltage drops linearly with the frequency inside the predetermined frequency range. It is thus an attenuation that depends linearly on the frequency, although any suitable functional relationship can be utilized.

Finally, a third output function 83 is depicted in FIG. 3. Similar to the second output function 82, according to the third output function 83 the load is turned off when the frequency of the local power grid 9 is within the predetermined frequency range. However, the pertinent predetermined frequency range lies now between 62.5 Hz and 64.5 Hz. Thus, when the frequency of the local power grid 9 is below 62.5 Hz, the power control means 512 continue to feed the load connected to the electrical outlet with the power at the local power grid without attenuation. The predetermined frequency range from 60.7 Hz to 64.5 Hz according to the third output function 83 overlaps with and is in fact completely within the predetermined frequency range from 62.5 Hz to 64.5 Hz according to the first output function 81.

All of the electrical outlets 51, 52, 53 shown FIG. 1 can be of the kind shown in FIG. 2. However, for the following discussion, it is assumed that the third outlet 53 is a passive outlet, which provides the power from the local power grid 9 directly to the load connected to it. Furthermore, the frequency measuring means and power control means of the first electrical outlet 51 is assumed to follow the first output function 81, while those of the second electrical outlet 52 is assumed to follow the second output function 82. As long as the frequency of the local power grid 9 is adjusted to below 60.7 Hz, all three electrical outlets 51, 52, 53 will pass the power from the local power grid through to their respective loads unattenuated. When the inverter device 3 raises its output frequency to a value between 60.7 Hz and 62.5 Hz, in the following labelled as a first-priority frequency range Δf1, the first electrical outlet 51 will still pass through the power to the load(s) connected to it unattenuated. However, the second electrical outlet 52 will disconnect the load(s) connected to it from the local power grid 9.

Once the inverter device 3 raises its output frequency to a value between 62.5 Hz and 64.5 Hz, the predetermined frequency range of the second output function 82, both the first electrical outlet 51 and the second electrical outlet 52 will disconnect the load(s) connected to them from the local power grid 9. Because the third electrical outlet 53 is a passive outlet according to this embodiment, the load(s) connected to it will still remain connected to the full power of the local power grid 9, regardless of the frequency. The load(s) connected to the third electrical outlet 53 may be (an) essential load(s) such as a computer cooling system, a refrigerator, or the like. The load(s) connected to the second electrical outlet 52 may be non-essential, but still be prioritized over other loads, namely the ones connected to the first electrical outlet 51. In this way, the loads may be separated into different priority groups depending on the electrical outlet they are plugged into.

Figure 4:
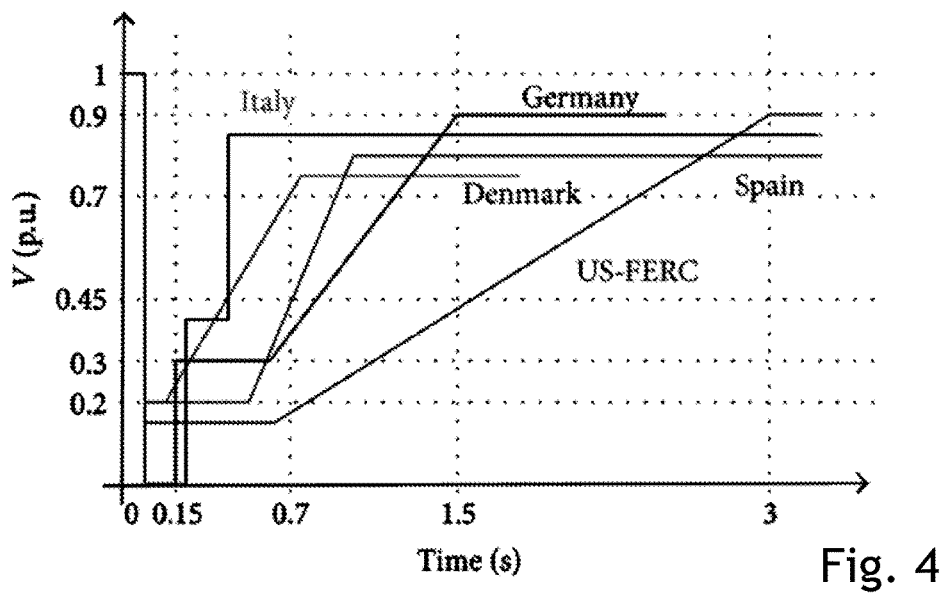
FIG. 4 shows a voltage/duration diagram for a voltage ride-though implementation.
Figure 5:
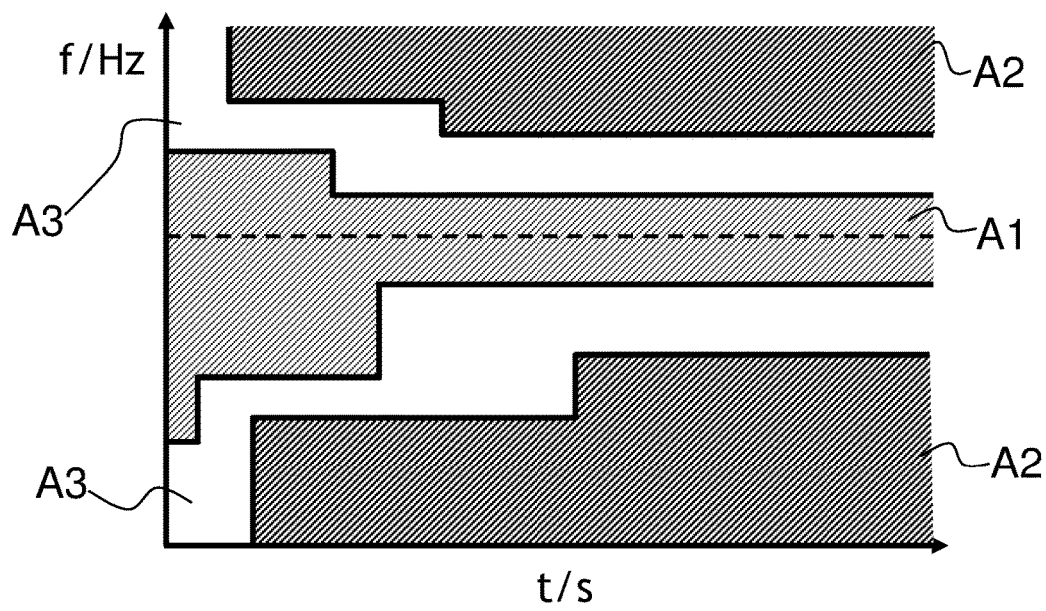
FIG. 5 shows a frequency/duration diagram for a frequency ride-though implementation.

Implementation of advantageous voltage ride-though regimes and frequency ride-through regimes are shown in FIGS. 4 and 5. FIG. 4 shows a voltage-duration diagram with different curves. The voltage with respect to the nominal voltage (p.u.=per unit) at the local grid is plotted along the vertical axis, while the time duration for which a certain voltage value persists at the local grid is shown along the horizontal axis.

Each curve shows a preferred response of the power control means of an electrical outlet designed for distribution in a certain country. In order to implement such a voltage ride-though, the electrical outlet further has to comprise a clock and power measuring means. Taking the example of the United States Federal Energy Regulatory Commission (US-FERC), if a voltage drop down to about 15% of the nominal voltage is recorded by the power measuring means, and this voltage drop persists for a duration of less than 0.6 s, then the power control means will not disconnect the load from the local grid. Of course the voltage provided to the load may still be the low value of 15% of the nominal voltage. If, however, this extreme voltage drop persists for 0.7 s or longer, then the load will be disconnected from the local grid. On the other hand, if the voltage at the local grid drops only mildly to a range from 90% to 100% of the nominal voltage, the load will not be disconnected from the local grid, irrespective of the duration of the voltage drop.

FIG. 5 shows a frequency-duration diagram, where the vertical axis shows the frequency at the local grid, while the duration for which a certain frequency is maintained at the local grid is shown along the horizontal axis. The nominal frequency, i.e. the frequency which is usually maintained at the local grid and/or at the external power grid, is shown with a horizontal dashed line.

There are 5 areas defined in the diagram of FIG. 5. In order to implement such a frequency ride-though, the electrical outlet further has to comprise a clock. A first area A1 encompasses the nominal frequency for any duration. A current frequency at the local grid and the duration during which the power at the local grid is at this frequency together form a frequency/duration pair, which can be compared to the diagram in FIG. 5. If the frequency/duration pair falls within the first area A1, the power to the load is not disconnected by the power control means of the corresponding electrical outlet. If, on the other hand, the frequency/duration pair falls within one of the two second areas A2 shown in the diagram, the load is certainly disconnected. Finally, if the frequency/duration pair falls within one of the two third areas A3 shown in the diagram, the load may stay connected to the local grid or be disconnected, depending on other parameters. For example, in this case an inquiry may be sent to a user of the load prompting him to verify whether the load can be disconnected or not.

REFERENCE NUMERALS 1 grid connection
2 battery (electrical power source)
3 inverter device
4 electrical distribution panel
41 circuit breakers
51 first electrical outlet
510 outlet housing
511 frequency measuring means
512 power control means
52 second electrical outlet
53 third electrical outlet
6 transfer switch
81 first output function
82 second output function
83 third output function
9 local power grid
A1 first area in frequency-duration diagram
A2 second area in frequency-duration diagram
A3 third area in frequency-duration diagram

The invention claimed is:

1. An energy supply system comprising an electrical power source, an inverter device connected to said electrical power source for converting electrical power provided by said electrical power source for feeding into a local power grid, and an electrical outlet connected to said inverter device through said local power grid for providing electrical power from said inverter device to a load when said load is connected to said electrical outlet, wherein said electrical outlet comprises frequency measuring means for measuring the frequency of the electrical power fed into said local power grid by said inverter device and power control means for controlling said electrical power provided to said load by said electrical outlet dependent on the measured frequency.

2. The energy supply system of claim 1, wherein said power control means are adapted to supply electrical power from said local power grid to said load substantially unattenuated, if the measured frequency lies within a nominal frequency range.

3. The energy supply system of claim 1, wherein said power control means are adapted to electrically disconnect said load from said local power grid or to supply electrical power from said local power grid to said load in attenuated fashion, if the measured frequency lies within a predetermined frequency range.

4. The energy supply system of claim 3, wherein said power control means are adapted such that said attenuation of the electrical power supplied from said local power grid to said load is a function of the measured frequency.

5. The energy supply system of claim 3, comprising one or more further electrical outlet connected to said inverter device through said local power grid for providing electrical power from said inverter device to a further load, wherein said power control means are adapted to electrically disconnect said further load from said local power grid or to supply electrical power from said local power grid to said further load in attenuated fashion, if the measured frequency lies within a further predetermined frequency range, wherein said further predetermined frequency range differs from said predetermined frequency range.

6. The energy supply system of claim 1, comprising a main grid connection and a transfer switch adapted to switch the feed into said local power grid between said inverter device and said main grid connection.

7. The energy supply system of claim 3, wherein said predetermined frequency range lies outside of a frequency fluctuation range of a frequency of a main grid.

8. The energy supply system of claim 1, wherein said power control means are adapted for controlling said electrical power provided to said load by said electrical outlet dependent on the measured frequency after a predetermined time delay.

9. The energy supply system of claim 1, wherein said electrical outlet comprises a clock and said power control means are adapted to reduce or cut electrical power provided to said load by said electrical outlet, if the measured frequency lies within a predetermined frequency range for a duration measured by said clock, which lies within a predetermined duration range.

10. The energy supply system of claim 1, wherein said electrical outlet comprises a clock and power measuring means adapted to measure a power level on said local power grid, and wherein said power control means are adapted to reduce or cut electrical power provided to said load by said electrical outlet, if the measured power level lies within a predetermined power range for a duration measured by said clock, which lies within a predetermined duration range.

11. The energy supply system of claim 1, wherein said inverter device is adapted to adjust the frequency of the electrical power fed into said local power grid dependent on a power level of said electrical power source.

12. The energy supply system of claim 1, wherein said electrical power source comprises a battery.

13. The energy supply system of claim 1, wherein said electrical outlet is an electrical receptacle or an electrical socket.

14. The energy supply system of claim 1, wherein said frequency measuring means and/or said power control means are realized inside a housing of said electrical outlet.

15. An electrical outlet adapted for connecting to an inverter device through a local power grid, adapted for receiving a connector of a load for providing electrical power from said inverter device to said load, and comprising frequency measuring means for measuring the frequency of the electrical power feed into said local power grid by said inverter device and power control means for controlling said electrical power provided to said load dependent on the measured frequency.

16. The electrical outlet of claim 15, wherein said power control means are adapted to supply electrical power from said local power grid to said load substantially unattenuated, if the measured frequency lies within a nominal frequency range.

17. The electrical outlet of claim 15, wherein said power control means are adapted to electrically disconnect said load from said local power grid or to supply electrical power from said local power grid to said load in attenuated fashion, if the measured frequency lies within a predetermined frequency range.

* * * * *